(No Model.)
H. P. FAIRFIELD & C. H. BENJAMIN.
ROTARY CUTTER.
No. 388,547. Patented Aug. 28, 1888.
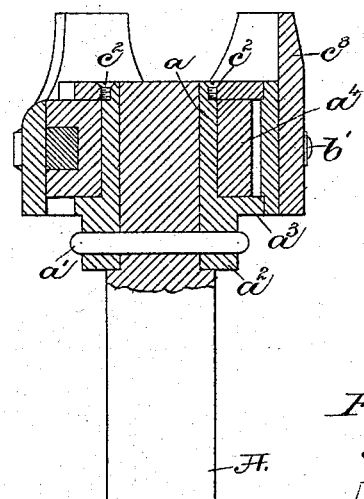
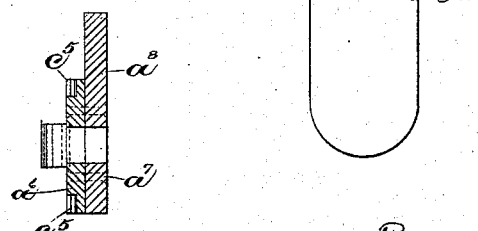
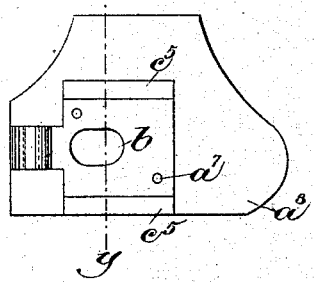
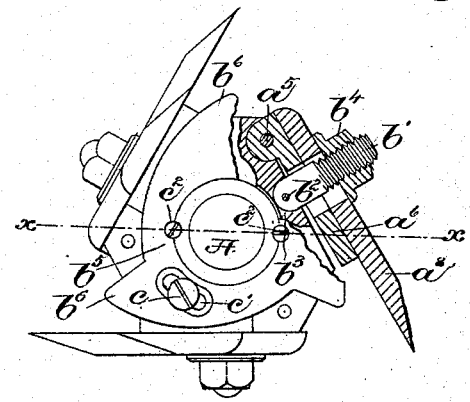
Witnesses.
John C. Edwards.
Fred L. Emery.
Inventors,
Hadley P. Fairfield,
Charles H. Benjamin
By Crosby & Gregory, Attys

UNITED STATES PATENT OFFICE.

HADLEY P. FAIRFIELD, OF WEST MEDFORD, AND CHARLES H. BENJAMIN, OF BOSTON, ASSIGNORS TO JAMES W. BROOKS, TRUSTEE, OF CAMBRIDGE, MASSACHUSETTS.

ROTARY CUTTER.

SPECIFICATION forming part of Letters Patent No. 388,547, dated August 28, 1888.

Application filed October 31, 1887. Serial No. 253,842. (No model.)

*To all whom it may concern:*

Be it known that we, HADLEY P. FAIRFIELD, of West Medford, county of Middlesex, State of Massachusetts, and CHARLES H. BENJAMIN, of Boston, county of Suffolk, and State of Massachusetts, have invented an Improvement in Rotary Cutters, of which the following description, in connection with the accompanying drawings, is a specification, like letters on the drawings representing like parts.

This invention relates to rotary cutters, especially adapted, among other things, to be used on machines for trimming heels of boots or shoes, it having for its object to construct the rotary cutter in such manner that the knives may be automatically adjusted together to place them in position to be sharpened.

In accordance with my invention the knives are pivoted to a cutter-head, which in practice is fitted upon a shaft or arbor of the machine on which the cutter is to be used, the said knives being adapted to be acted upon by a cam plate or disk to move the knives on their pivots and place them in position to be sharpened, and thereafter be retained in such position for use.

Our invention therefore consists, essentially, in a rotary cutter, a cutter-head and a knife pivotally secured thereto, combined with a cam plate or disk adapted to act on the said knife, substantially as and for the purpose specified.

Other features of our invention will be pointed out in the claims at the end of this specification.

Figure 1 is a vertical section of a rotary cutter embodying one form of our invention, the shaft or arbor on which it is mounted being shown partially in elevation, the section being taken on line $xx$, Fig. 2; Fig. 2, a top view of Fig. 1 partially broken out; Fig. 3, a detail of one of the knives, and Fig. 4 a section of Fig. 3 on line $yy$.

The shaft or arbor A, which may be a shaft of a wheel trimming-machine of any usual or well-known construction, has mounted upon it a thimble or sleeve, $a$, secured to the said shaft, as herein shown, by a pin, $a'$, inserted through a collar or enlarged portion, $a^2$, of the said thimble or sleeve, the said collar having, as shown, cam-shaped projections or flanges $a^3$.

The thimble or sleeve $a$ receives upon it a cutter-head, $a^4$, herein shown as hexagonal in shape, three of the sides of the head having pivoted upon them at $a^5$ knife-carriers $a^6$, (see Fig. 2,) each knife-carrier having secured to it, as herein shown, by screws $a^7$, a knife, $a^8$.

Each knife-carrier and knife secured thereto has a slot, $b$, through which is extended a screw, $b'$, pivoted, as at $b^2$, in a slot, $b^3$, (see Fig. 2,) in the cutter-head, the said screw receiving upon it a nut, $b^4$, by which the knife may be held firmly to the cutter-head.

The cutter-head in practice is fitted upon the thimble $a$, it bearing against the cam projection or flange $a^3$, and is secured in place by a cam plate or disk, $b^5$, having cam-shaped arms or projections $b^6$, there being three arms herein shown, one for each knife, the said cam plate or disk being secured to the cutter-head, as shown, by a screw, $c$, inserted through a slot, $c'$, and to the thimble or sleeve $a$ by screws $c^2$. (See Figs. 1 and 2.) The cam-shaped arms $b^6$ co operate with and act upon a curved portion, $c^5$, of the knife-carriers $a^6$. (See Figs. 3 and 4.)

In operation the cutter-head is fastened to the shaft by the plate or disk $b^5$ and screws $c^2$, and the knives are fastened firmly to the cutter-head by the nuts $b^4$. When it is desired to sharpen the knives, the nuts $b^4$ and the screws $c$ are loosened, and either the shaft A or the cutter-head turned, and the cam projections or arms acting upon the curved portions $c^5$ turn the knife-carriers on their pivots and move the tips or cutting-edges of the knives or blades in the arc of a circle. When the knives have been placed in the desired or proper position, they are clamped in said position by the nuts $b^4$, and the cutter-head is again fastened to the shaft. The knives may now be sharpened by grinding or in other usual manner. The knives may be moved as described, so that a minimum amount of grinding is required to sharpen them, thus effecting a saving of metal and prolonging the life of the knife.

It is evident that the knife-carrier $a^6$ and the knife $a^8$ may be one piece.

We do not broadly claim the adjusting simultaneously of the knives.

We claim—

1. In a rotary cutter, a cutter-head and knives pivotally secured thereto, combined with a cam plate or disk to act on and adjust the said knives simultaneously, substantially as and for the purpose specified.

2. The combination, with a shaft, of a thimble or sleeve, $a$, mounted thereon, a cutter-head, knives secured thereto, and a cam plate or disk, $b^5$, substantially as described.

3. The combination, with a shaft, of a thimble or sleeve, $a$, mounted thereon, a cutter-head, knives pivotally secured thereto, and a cam plate or disk, $b^5$, substantially as described.

4. The combination, with a shaft, of a thimble or sleeve, $a$, provided with cam projections or flanges, a cutter-head, knives pivotally secured thereto, a cam plate or disk, $b^5$, and means to firmly fasten the said knives to the cutter-head, substantially as described.

5. The combination, with a shaft, of a thimble or sleeve, $a$, provided with cam projections or flanges, a cutter-head, knife-carrier pivoted thereto, and knives fixed to said carriers, a cam plate or disk, $b^5$, having a slot, $c'$, means to secure said plate to the cutter-head, and means to firmly fasten the said knives to the cutter-head, substantially as described.

In testimony whereof we have signed our names to this specification in the presence of two subscribing witnesses.

HADLEY P. FAIRFIELD.
CHARLES H. BENJAMIN.

Witnesses:
JAS. H. CHURCHILL,
F. L. EMERY.